United States Patent
Seng

(10) Patent No.: US 9,039,294 B2
(45) Date of Patent: May 26, 2015

(54) METHOD TO ASSEMBLE AND POLISH A CONNECTOR WITH OPTICAL FIBER THAT HAS AIR-GAPS OR "VOIDS" IN ITS CLADDING

(75) Inventor: Kheng Hwa Seng, Spartanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 759 days.

(21) Appl. No.: 12/744,595

(22) PCT Filed: Dec. 11, 2009

(86) PCT No.: PCT/US2009/067699
§ 371 (c)(1), (2), (4) Date: May 25, 2010

(87) PCT Pub. No.: WO2010/068885
PCT Pub. Date: Jun. 17, 2010

(65) Prior Publication Data
US 2011/0081115 A1    Apr. 7, 2011

Related U.S. Application Data

(60) Provisional application No. 61/121,693, filed on Dec. 11, 2008.

(51) Int. Cl.
G02B 6/36  (2006.01)
G02B 6/38  (2006.01)
G02B 6/25  (2006.01)

(52) U.S. Cl.
CPC ............ G02B 6/3863 (2013.01); G02B 6/25 (2013.01)

(58) Field of Classification Search
USPC ............................................... 385/78
See application file for complete search history.

(56) References Cited

U.S. PATENT DOCUMENTS

| | | | |
|---|---|---|---|
| 2003/0091293 A1* | 5/2003 | Murata et al. | 385/70 |
| 2003/0156799 A1* | 8/2003 | Wada et al. | 385/85 |
| 2005/0223748 A1 | 10/2005 | Ames et al. | |
| 2008/0037939 A1 | 2/2008 | Xiao et al. | |
| 2008/0110209 A1 | 5/2008 | Bookbinder et al. | |
| 2008/0253726 A1 | 10/2008 | Kurosawa et al. | |

* cited by examiner

*Primary Examiner* — Sung Pak
(74) *Attorney, Agent, or Firm* — Sughrue Mion, PLLC

(57) ABSTRACT

A method for assembling a fiber optic connector that includes heating an end of a cleaved fiber, inserting the end of the cleaved fiber into a ferrule until the end protrudes from the ferrule, wherein a first portion of the heated end protrudes from the ferrule and a second portion of the heated end remains in the ferrule, fixing the fiber in place in the ferrule, and polishing the end of the cleaved fiber.

21 Claims, 14 Drawing Sheets

SC

LC

ST

METHOD TO ASSEMBLE AND POLISH A CONNECTOR WITH OPTICAL FIBER THAT HAS AIR-GAPS OR "VOIDS" IN ITS CLADDING

CROSS-REFERENCE TO RELATED PATENT APPLICATION

This application claims the benefit of U.S. Provisional Application No. 61/121,693, filed on Dec. 11, 2008 in the United States Patent and Trademark Office, the disclosure of which is incorporated by reference in its entirety.

BACKGROUND OF THE INVENTION

1. Field of the Invention

Methods consistent with the present invention relate to assembling a connector with an optical fiber that has air gaps or voids in its cladding, and more particularly to, heating the end of a bend-optimized fiber that has nanometer-scale air pockets infused in the cladding to close the air pockets before assembling the fiber in the connector.

2. Description of the Related Art

Bend-optimized optical fibers include a core that is surrounded by a cladding. A mesh of nanometer-scale air pockets is infused in the cladding to serve as a barrier that guides light back into the core when the fiber is bent with a very small bending radius, such as 1 cm. Bend-optimized optical fibers solve historic technical challenges related to installing fiber-to-the-home (FTTH) networks in high-rise apartment buildings and condominium complexes. Bend-optimized optical fibers prevent signal loss when bent around corners and routed through a building, enabling telecommunications carriers to install optical fiber cable into these complex environments and provide their customers with the near-infinite bandwidth benefits of a true FTTH solution.

Sections of bend-optimized fiber can be terminated on the ends with connectors, to allow regular connecting and disconnecting to an optical device or patching through adapters, that may be housed on modules, panels or shelves. Common types of connectors include SC, LC and ST connectors. FIG. 1 shows the typical components of a 3 mm and 900 µm SC connector. FIG. 2 shows the typical components of a 1.6/2.0 mm and 900 µm LC connector. FIG. 3 shows the typical components of a 3 mm and 900 µm ST connector.

Next, conventional methods of assembling 900 µm buffered Fiber, 3 mm (ST and SC only) and 1.6 mm or 2.0 mm (LC only) cable with Strength Member to connectors will be described with reference to FIGS. 4-11. However, other known methods of assembly may be used.

For 900 µm: Slide the small rubber boot onto the fiber. For 1.6/2.0/3.0 mm: Slide the strain relief boot and crimp sleeve onto the cable.

For 1.6/2.0/3.0 mm: Strip the cable jacket using a jacket stripper. Cut Kevlar with scissors. See FIGS. 4A, 4B and 4C.

Then remove the buffer from the fiber using a fiber strip tool, exposing the bare fiber. FIGS. 4A, 4B and 4C.

Clean the stripped fiber by drawing it through a cloth wipe soaked with fiber prep fluid. Sometimes the fiber may be primed by dipping and spraying the fiber and buffer with an adhesive primer. Common adhesives used for factory assembly of connectors include Epotek 353ND and Tracon F123. Common adhesive used for field assembly of connector includes Loctite 680. Place a needle on the nozzle of an adhesive bottle, such as Loctite 680.

Referring to FIGS. 5A, 5B and 5C, insert the needle into the ferrule stem until it bottoms against the base of the ceramic. Inject the adhesive into the ferrule until a bead of adhesive is seen at the front end of the ferrule. At this time, the ceramic ferrule should be filled half full with adhesive. Stop the adhesive injection process and remove the needle. Note that the adhesive should not be in the stem of the connector.

Next, referring to FIGS. 6A, 6B and 6C, carefully insert the fiber into the ferrule, pushing the 900 µm buffer into the connector until it stops (a slight rotation of the connector helps to feed the fiber through). The fiber should be protruding from the front of the ceramic ferrule.

Referring to FIGS. 7A, 7B and 7C, use a scribe tool to remove excess fiber by lightly scoring the fiber where it protrudes from the ceramic ferrule. To remove the excess, gently pull on the fiber.

Referring to FIGS. 8A, 8B and 8C, for 1.6/2.0/3.0 mm: Flare Kevlar out around the rear of the connector. Slide the crimp sleeves forward, capturing the Kevlar between the sleeve and the connector.

Referring to FIGS. 9A, 9B and 9C, for LC Only: Crimp the sleeve over the connector back shell. Using a heat gun, shrink the crimp sleeve tubing to fit the cable jacket. For SC & ST Only: Crimp the sleeve using the 0.178" die over the connector back shell, and the 0.151" die to crimp over the cable jacket. At this stage, if the assembly is made with a heat curing adhesive, such as Epotek 353ND or Tracon F123, the connector would have to be cured in an heat over, before shrinking the heat shrinks.

Then, for 900 µm: Push the boot up onto the rear of the connector. For 1.6/2.0/3.0 mm: Push the strain relief over the crimp sleeve and the cable jacket.

Next, use a cloth wipe (with fiber prep fluid) to dust off the surface of the rubber disc and metal polishing tool. Holding the 3 µm diamond film in one hand and the connector in the other, gently sand the fiber stub and any adhesive from the face of the ceramic ferrule. Clean the connector end face using a cloth wipe (with fiber prep fluid). Position the connector assembly in the metal polishing tool.

Referring to FIGS. 10A, 10B and 10C, place a piece of 3 µm AL203 film on the rubber pad (a small amount of water on the rubber pad will keep film in place). Add several drops of water on the film surface. Using a slow figure-8 motion, polish the end face for about 10 cycles.

Then, remove the 3 µm AL203 film from the rubber pad and wipe the connector again with a cloth wipe. Repeat the previous polishing step using 1 µm AL203 film.

Next, inspection of the fiber is recommended using a 100× microscope between steps to insure the fiber is not damaged. The entire fiber end-face should be visible without any cracks or significant scratches.

For SC only: After polishing, slide the SC coupling housing over the polished assembly until it latches.

Finally, referring to FIGS. 11A, 11B and 11C, place a dust cover on the connector until ready to use. Installation is now complete.

As described above, the polishing steps may include both dry and wet polishing processes. This can create a problem for fibers with air pockets because the nanometer-scale pockets infused in the cladding may trap debris from polishing films or fluids. If debris is trapped in the fiber, the optical performance of the fiber may be degraded. In addition, if debris stays in the fiber for a long period of time, the mechanical performance of the fiber may also degrade.

It is therefore an objective of this invention to assemble a connector with fibers with air pockets, such as bend optimized fibers, that prevents debris from being trapped in the fiber.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An exemplary embodiments of the present invention provides a method for assembling a fiber optic connector that includes heating an end of a cleaved fiber; inserting the end of the cleaved fiber into a ferrule until the end protrudes from the ferrule, wherein a first portion of the heated end protrudes from the ferrule and a second portion of the heated end remains in the ferrule; fixing the fiber in place in the ferrule; and polishing the end of said cleaved fiber.

According to another aspect of the present invention, the fiber can be a bend-optimized fiber or a fiber that has a cladding with air pockets.

According to another aspect of the present invention, the fiber is heated by an arc discharge.

According to another aspect of the present invention, the arc discharge is a 20-bit arc.

According to another aspect of the present invention, the arc discharge has a current between approximately 11 and 13 mamp.

According to another aspect of the present invention, the arc discharge is applied for approximately 0.5 seconds.

According to another aspect of the present invention, the arc discharge is applied at least approximately 200 µm from the end of the fiber.

According to another aspect of the present invention, the heated end of the fiber is approximately 2.5 mm.

Another exemplary embodiment of the present invention provide a method for assembling a fiber optic connector that includes heating a section of fiber; inserting the fiber into a ferrule until the fiber protrudes from the ferrule, wherein a first portion of the heated section protrudes from the ferrule and a second portion of the heated section remains within the ferrule; fixing the fiber in place in the ferrule; and polishing the end of the cleaved fiber.

According to another aspect of the present invention, the arc discharge is swept over the fiber at a speed of approximately 10 µm per second.

According to another aspect of the present invention, the heated section of the fiber is approximately 2.5 mm.

Another exemplary embodiment of the present invention provides connector that has a fiber with a cladding that has air pockets and a ferrule which contains a portion of the fiber, wherein the air pockets at the end of the fiber in the ferrule are collapsed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
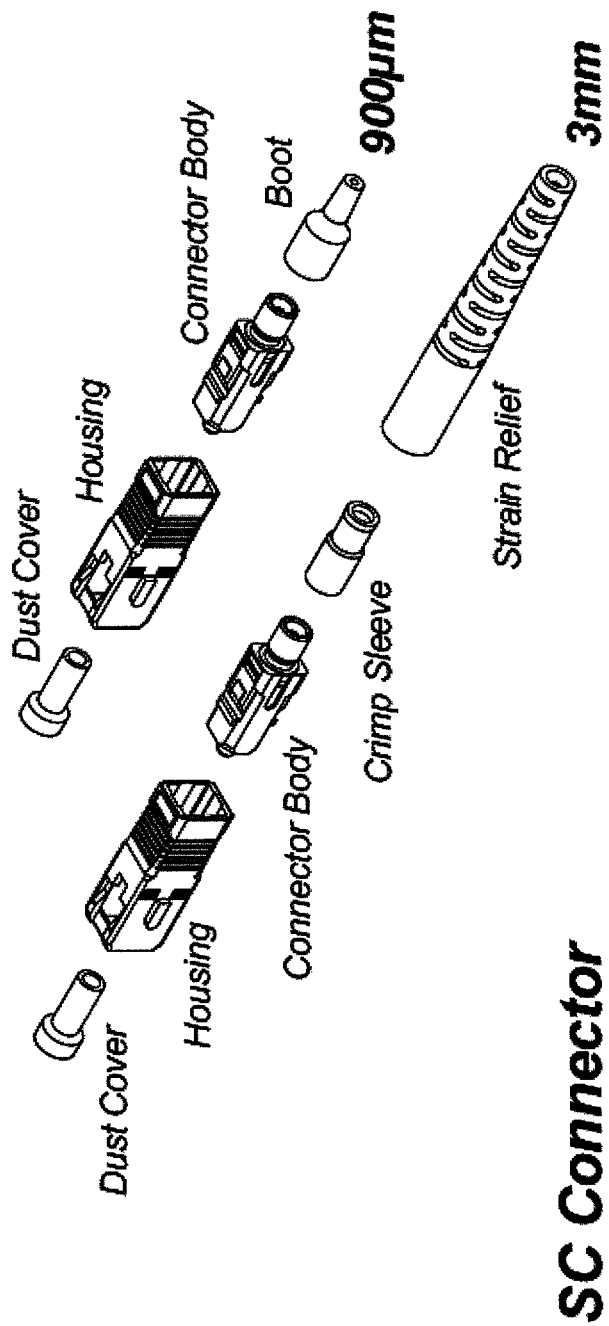
FIG. 1 shows the typical components of a 3 mm and 900 µm SC connector.
Figure 2:
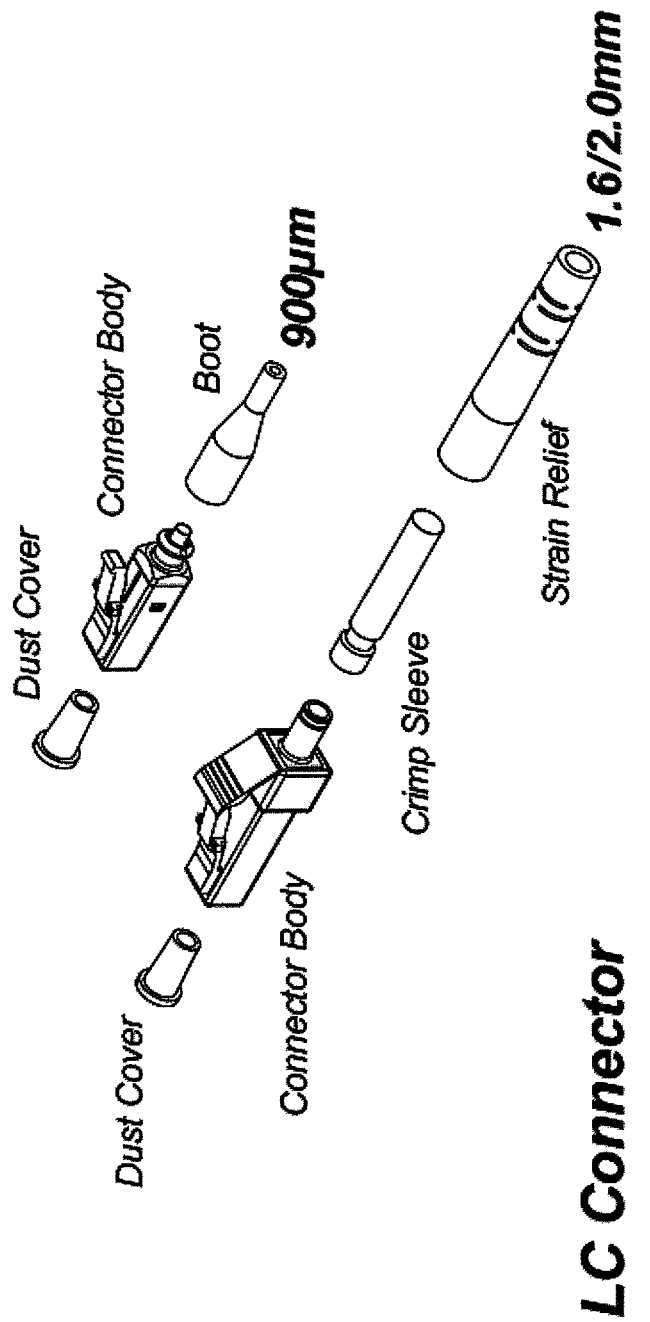
FIG. 2 shows the typical components of a 1.6/2.0 mm and 900 µm LC connector.
Figure 3:
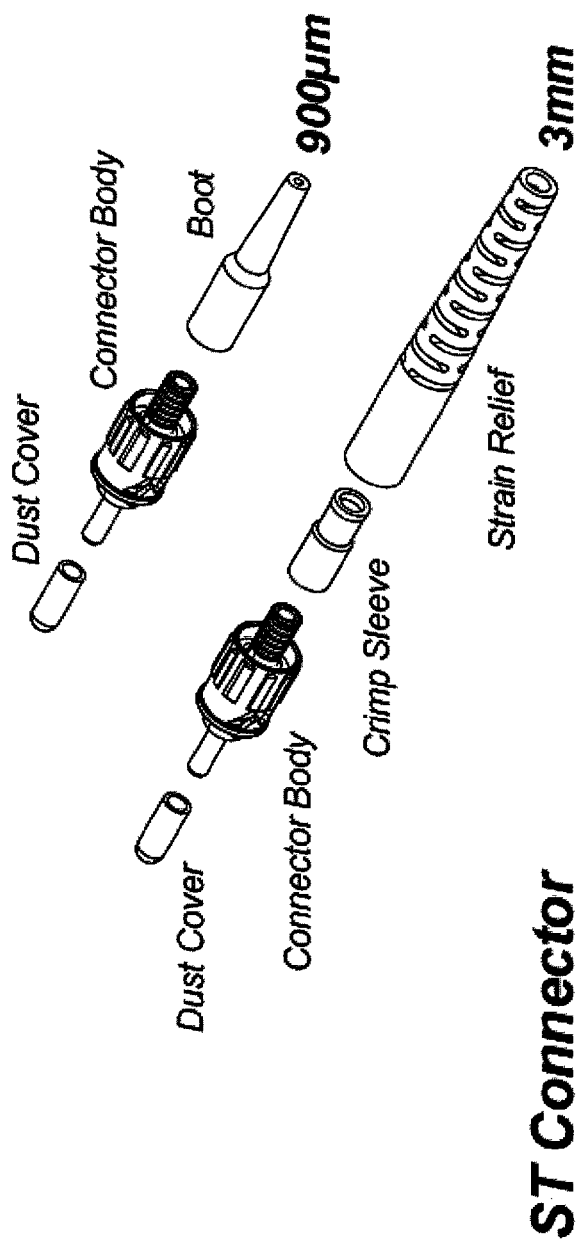
FIG. 3 shows the typical components of a 3 mm and 900 µm ST connector.
Figure 4A:
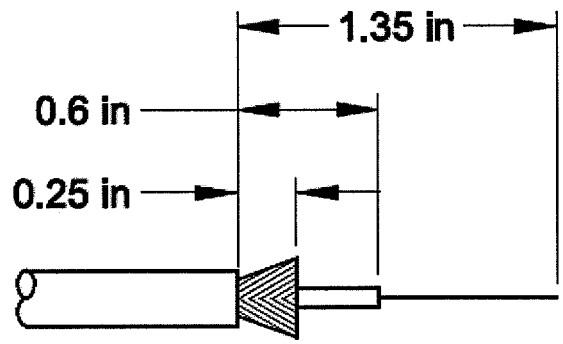
FIGS. 4-11 show conventional methods of assembling fibers in SC, LC and ST connectors.
Figure 4B:
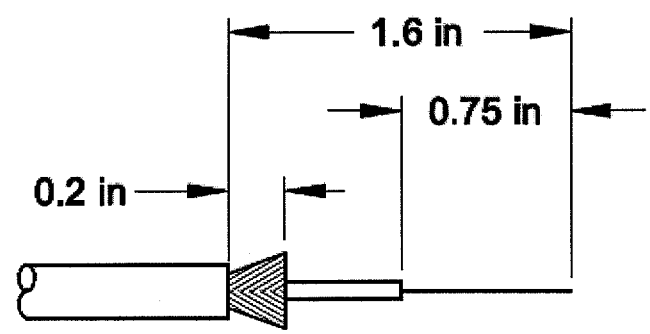
Figure 4C:
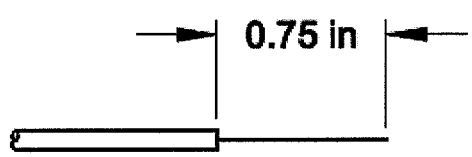
Figure 5A:
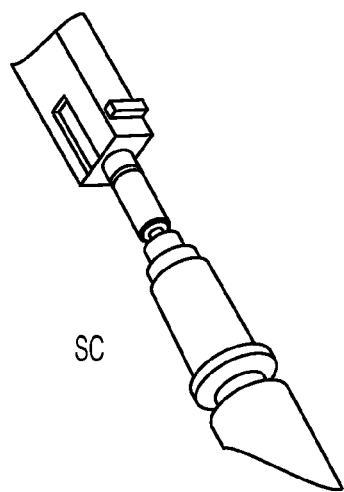
Figure 5B:
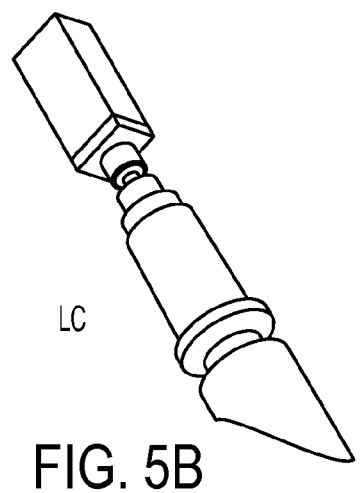
Figure 5C:
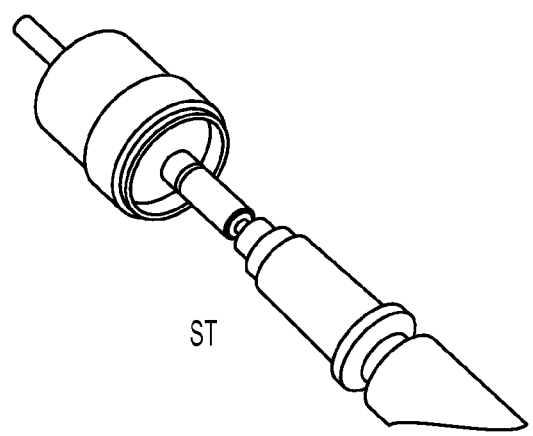
Figure 6A:
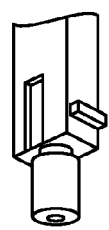
Figure 6B:
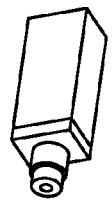
Figure 6C:
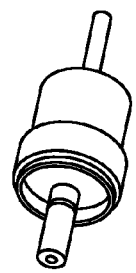
Figure 7A:
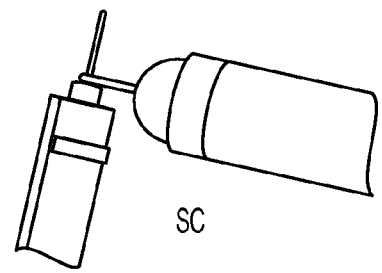
Figure 7B:
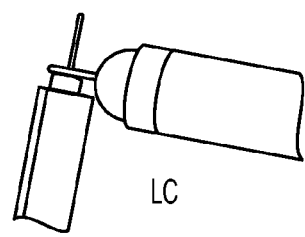
Figure 7C:
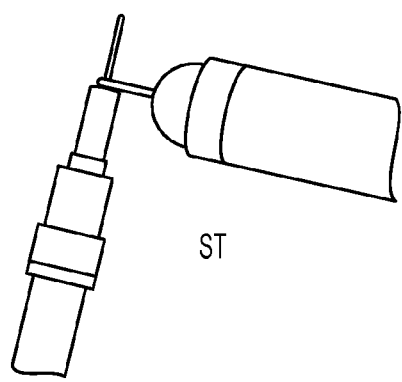
Figure 8A:
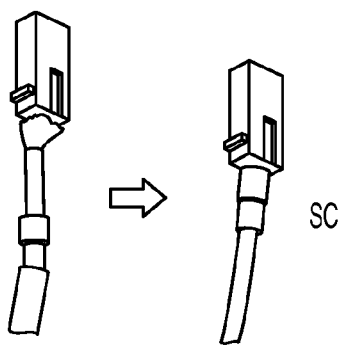
Figure 8B:
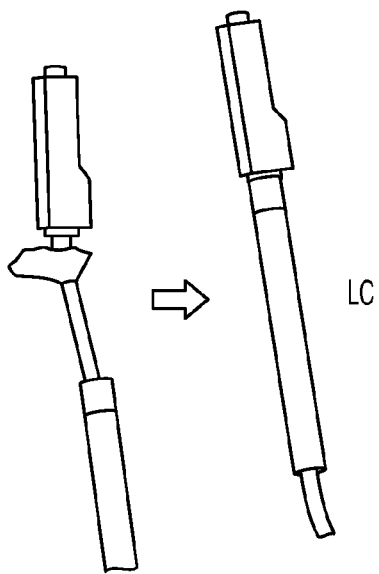
Figure 8C:
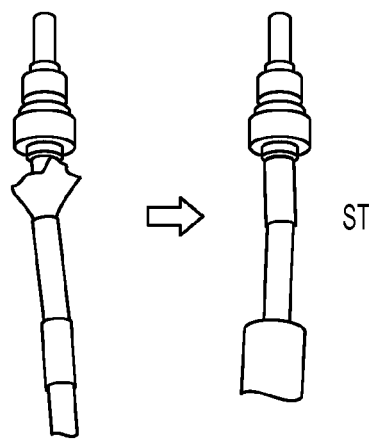
Figure 9A:
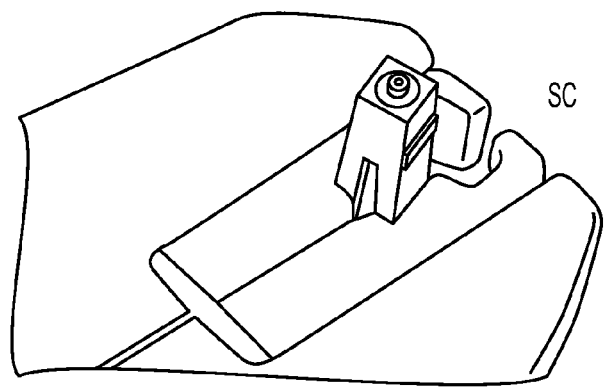
Figure 9B:
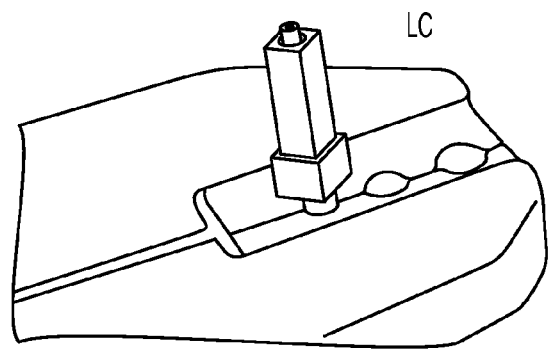
Figure 9C:
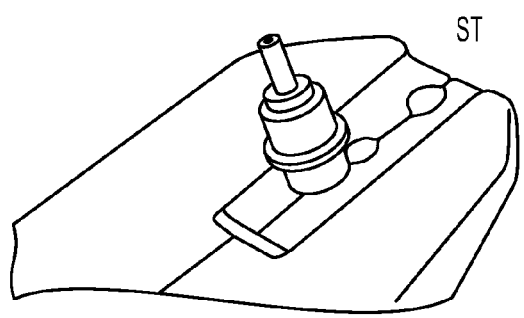
Figure 10A:
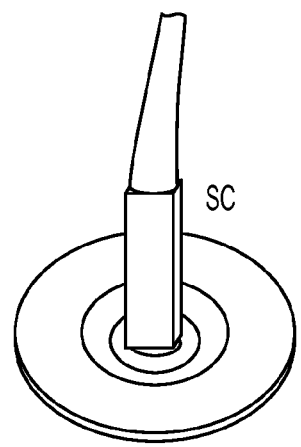
Figure 10B:
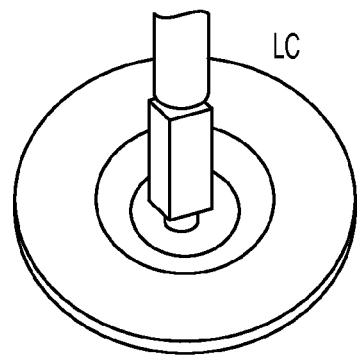
Figure 10C:
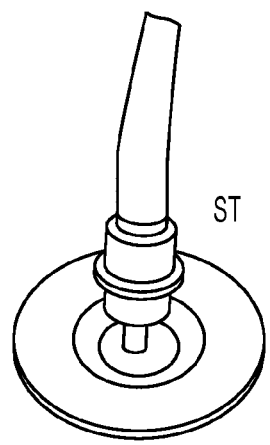
Figure 11A:
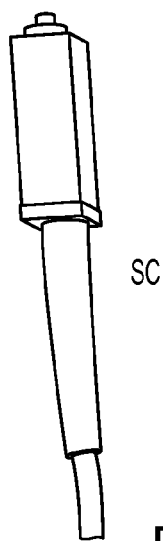
Figure 11B:
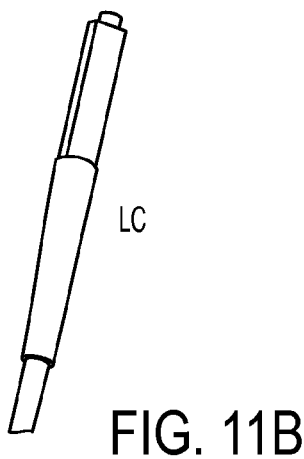
Figure 11C:
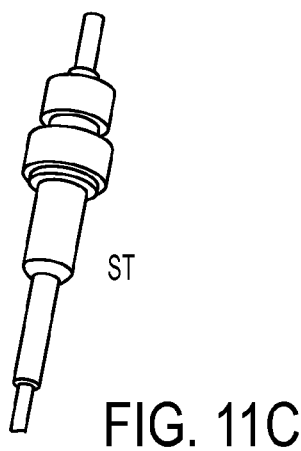

The present invention will now be described more fully with reference to the accompanying drawings, in which exemplary embodiments of the invention are shown. These embodiments are provided so that this disclosure will be thorough and complete, and will fully convey the concept of the invention to those skilled in the art. However, the invention may be embodied in many different forms, and should not be construed as being limited to the exemplary embodiments set forth herein. In the drawings, like reference numerals denote like elements, and the thicknesses of layers and regions may be exaggerated for clarity and convenience.

Figure 13:
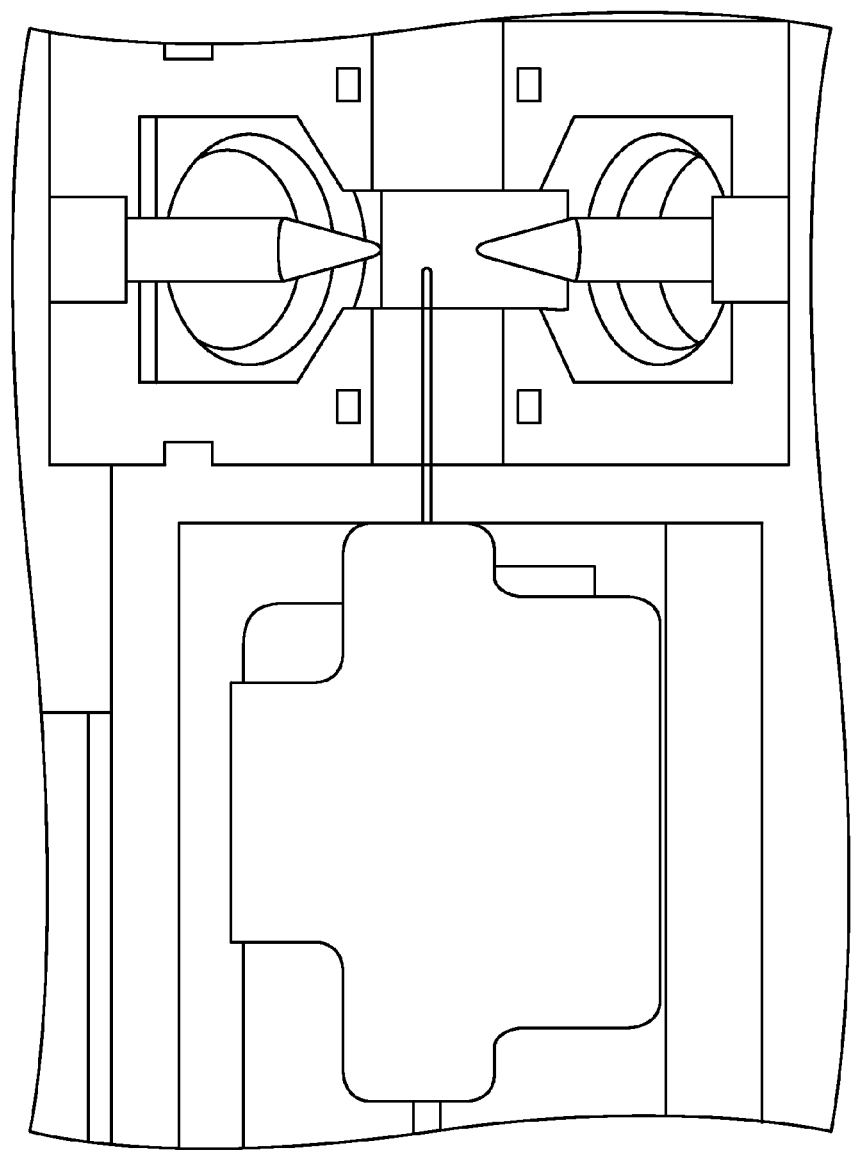
FIG. 13 is a diagram showing one method of heating a fiber.

According to an exemplary embodiment of the present invention, a cleaved fiber is heated at a small distance from the end of the fiber. One method of heating the fiber is to use an arc discharge. FIG. 13 shows a cleaved fiber placed in a splicer. Note that the fiber does not extend into the area directly between the two electrodes that produce the arc. An arc discharge is then applied to the fiber. The power of this arc is much weaker than a fusion splicing arc, but may be twice as strong as an ordinary cleaning arc. For example, a 20-bit arc may be applied for approximately 0.5 seconds. The 20-bit arc has a current between approximately 11 mamp and 13 mamp.

Figure 12:
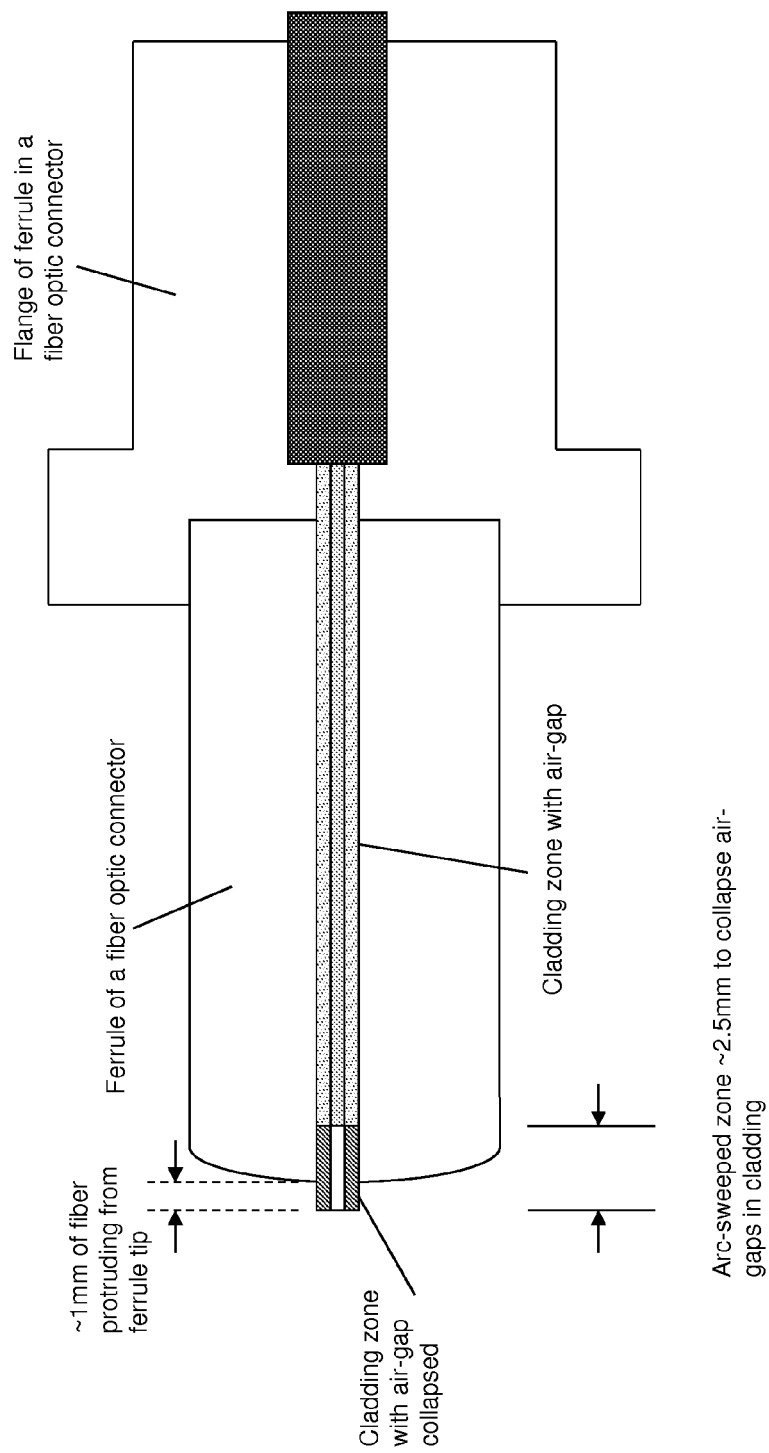
FIG. 12 is a diagram showing a heated treated fiber in a ferrule prior to polishing

In order to protect the sharp corners and flat surface of the fiber end achieved by the cleaving, the arc discharge is applied to the fiber at a distance from the fiber end. For example, the arc discharge may be applied at a distance of at least approximately 200 µm from the fiber end. The arc discharge treatment causes the mesh of nanometer-scale pockets in the fiber cladding to collapse and melt together with the cladding material. As a result of the heat treatment, the air pockets in an approximately 2.5 mm heated portion at the end of the fiber to collapse. See FIG. 12.

The heat treated fiber is then attached to a connector using know methods, such as one of the methods described in FIGS. 4-11 above, with the following differences.

When the fiber is inserted into the ferrule, it should be inserted until the end protrudes from the ferrule by approximately 1 mm. This results in a first portion of the heated portion protruding from the ferrule and a second portion of the heated portion remaining in the ferrule. See FIG. 12. Thus, the portion of the fiber that is polished does not have any air pockets and no debris will be trapped in the fiber.

Figure 14:
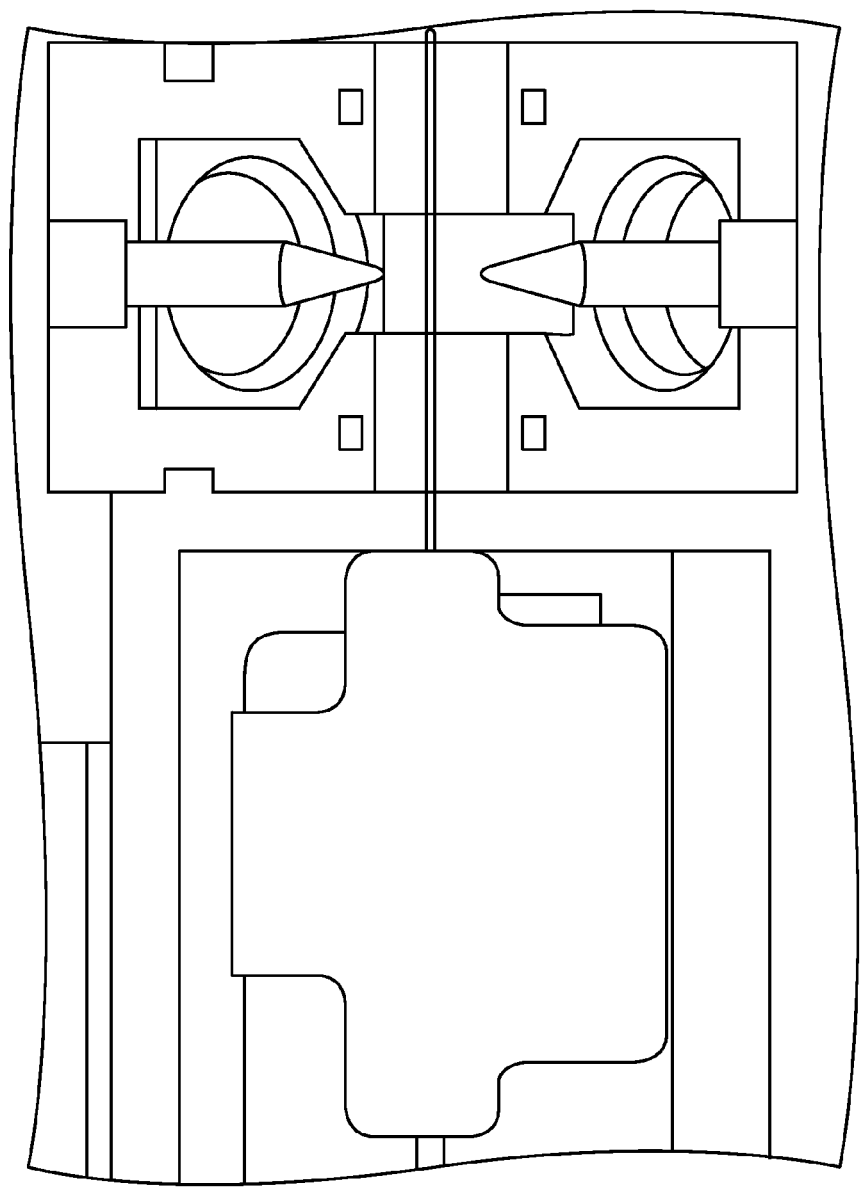
FIG. 14 is a diagram showing an alternate method of heating a fiber.

In another exemplary embodiment of the present invention, a bend-optimized optical fiber is stripped and loaded into the splicer without being cleaved. FIG. 14 shows the fiber placed in a splicer. Note that the fiber extends through arc discharge region. The fiber is then arc swept to collapse the mesh of nanometer-scale pockets in the fiber cladding. For example, a 20-bit arc may be swept over approximately 2.5 mm of the fiber at a sweeping speed of approximately 10 µm/sec. The end of the approximately 2.5 mm heated portion nearest the end of the fiber is then marked or identified.

The heat treated fiber is then attached to a connector using know methods, such as one of the methods described in FIGS. 4-11 above, with the following differences.

When the fiber is inserted into the ferrule, it should be inserted until the end protrudes from the ferrule such that the marked end of the heated portion protrudes by approximately 1 mm. This results in a first portion of the heated portion protruding from the ferrule and a second portion of the heated portion remaining in the ferrule. The excess fiber is then removed and the end is polished by the methods described above. Thus, the portion of the fiber that is polished does not have any air pockets and no debris will be trapped in the fiber.

The heat treated fibers can be used in many different types of connectors, including but not limited to SC, LC and ST connectors.

While the present invention has been particularly shown and described with reference to exemplary embodiments thereof, it will be understood by those of ordinary skill in the art that various changes in form and detail may be made therein without departing from the spirit and scope of the present invention as defined by the following claims and their legal equivalents.

What is claimed is:

1. A method for assembling a fiber optic connector comprising:
    heating an end of a cleaved fiber;
    inserting said end of said cleaved fiber into a ferrule until said end protrudes from said ferrule, wherein a first portion of said heated end protrudes from said ferrule and a second portion of said heated end remains in said ferrule;
    fixing said fiber in place in said ferrule; and
    polishing said end of said cleaved fiber.
2. The method of claim 1 wherein said fiber is a bend-optimized fiber.
3. The method of claim 1 wherein said fiber has a cladding and said cladding has air pockets.
4. The method of any one of claims 1, 2 and 3 wherein said fiber is heated by an arc discharge.
5. The method of claim 4 wherein the arc discharge is a 20-bit arc.
6. The method of claim 5 wherein the arc discharge has a current between approximately 11 and 13 mamp.
7. The method of claim 6 wherein the arc discharge is applied for approximately 0.5 seconds.
8. The method of claim 4 wherein the arc discharge is applied at least approximately 200 µm from the end of said fiber.
9. The method any one of claims 1, 2 and 3 wherein said heated end is approximately 2.5 mm.
10. A method for assembling a fiber optic connector comprising:
    heating a section of fiber;
    inserting said fiber into a ferrule until said fiber protrudes from said ferrule, wherein a first portion of said heated section protrudes from said ferrule and a second portion of said heated section remains within said ferrule;
    fixing said fiber in place in said ferrule;
    cleaving said fiber fixed in said ferrule; and
    polishing an end of said cleaved fiber fixed in said ferrule.
11. The method of claim 10 wherein said fiber is a bend-optimized fiber.
12. The method of claim 10 wherein said fiber has a cladding and said cladding has air pockets.
13. The method of any one of claims 10, 11 and 12 wherein said fiber is heated by an arc discharge.
14. The method of claim 13 wherein the arc discharge is a 20-bit arc.
15. The method of claim 14 wherein the arc discharge has a current between approximately 11 and 13 mamp.
16. The method of claim 15 wherein the arc discharge is applied for approximately 0.5 seconds.
17. The method of claim 13 wherein the arc discharge is swept over said fiber at a speed of approximately 10 µm per second.
18. The method any one of claims 10, 11 and 12 wherein said heated section is approximately 2.5 mm.
19. A connector comprising:
    a fiber with a cladding that has air pockets and
    a ferrule which contains a portion of said fiber,
    wherein
        said air pockets at an end of said fiber in said ferrule are collapsed,
        a portion of said end having collapsed air pockets that remains within said ferrule is at least 1.0 mm long, and
        said end is polished.
20. The method of claim 1, wherein:
    said heated end is at least 2.0 mm long; and
    said second portion of said heated end that remains in said ferrule is at least 1.0 mm long.
21. The method of claim 10, wherein:
    said heated portion is at least 2.0 mm long; and
    said second portion of said heated section that remains in said ferrule is at least 1.0 mm long.

* * * * *